Figure 1:
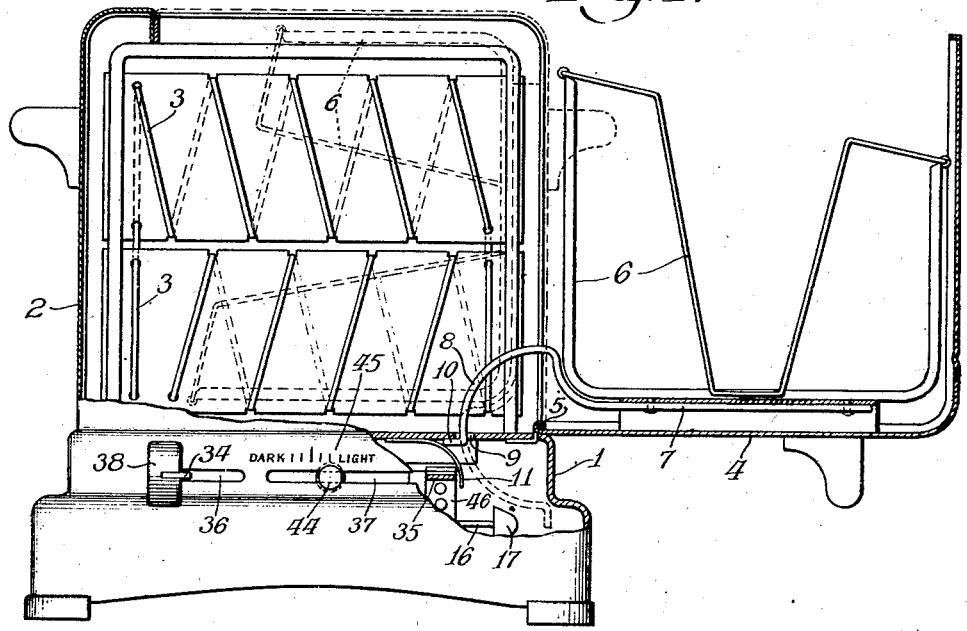

Sept. 6, 1938.   A. C. PURPURA   2,129,360
TOASTER
Filed Jan. 15, 1937   2 Sheets-Sheet 1

Inventor:
A. C. Purpura,
By Wm. F. Freudenreich
Attorney

Sept. 6, 1938.     A. C. PURPURA     2,129,360
TOASTER
Filed Jan. 15, 1937     2 Sheets-Sheet 2
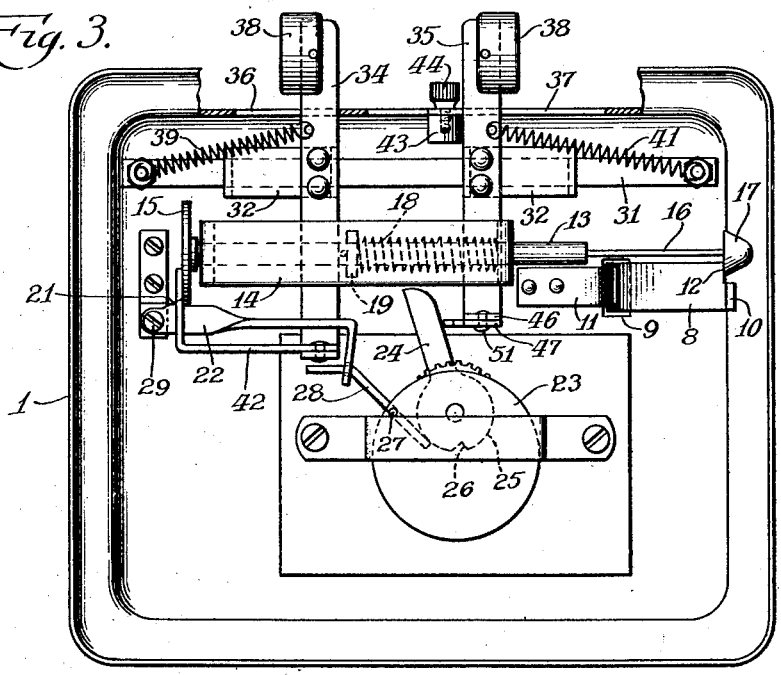
Fig. 3.
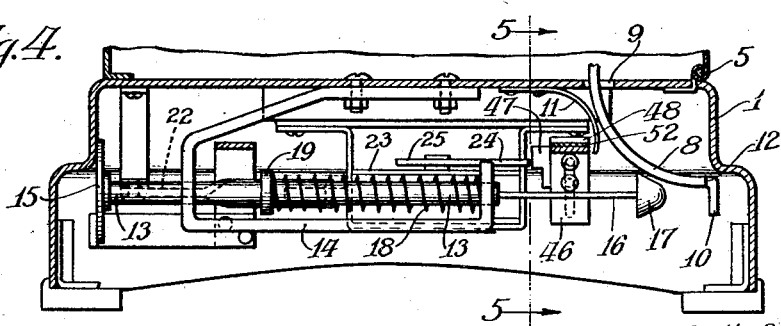
Fig. 4.
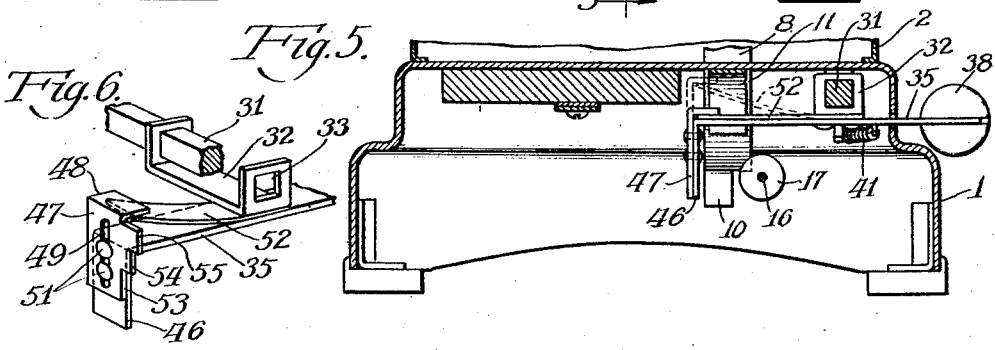
Fig. 5.
Fig. 6.
Inventor:
A. C. Purpura,
By Wm. F. Freudenreich,
Attorney Patented Sept. 6, 1938

2,129,360

UNITED STATES PATENT OFFICE 2,129,360

TOASTER

August C. Purpura, Chicago, Ill.

Application January 15, 1937, Serial No. 120,673

7 Claims. (Cl. 161—16)

The present invention has for its object to produce a novel, simple and efficient mechanism whereby the toast holder in a toasting device is automatically brought into an idle position at the termination of a suitable period following the setting of the mechanism.

It is common practice to provide a timing device which is energized by the pressing of a lever and which, at the end of a suitable period of time, moves the toast holder out of operative relation to the heating elements. In all of such mechanisms with which I am aware, the energy stored in the timing device is utilized to move the toast holder. Thus, the timing device must be designed to perform two functions and may perhaps not serve most advantageously with respect to either. Also, where the timing device acts upon the holder at the end of a toasting period, the movement of the holder must naturally be slow.

The object of the present invention may be said to be to provide a simple mechanism whereby the work of moving the toast holder into an open or idle position shall be performed by a motor other than the motor constituting or forming part of the timing device, whereby each motor may be so designed as best to perform its intended, single function.

In carrying out my invention, I provide an actuator for the holder which is energized and set or locked in an energized state until the desired toasting period has elapsed, whereupon the timing device simply trips a catch that releases the actuator.

Therefore, viewed in one of its aspects, the present invention may be said to have for its object to produce a simple and novel controlling mechanism for the toast holder in a toaster, whereby the holder may be shifted rapidly into an idle or open position by a snap-action actuator which is simply released through the action of the timing device.

The length of a toasting period usually depends upon the angular or other distance through which a finger piece is moved; variation in timing being obtained through regulating this distance. However, while a toaster is still cold, a longer period is required to produce a given toasted effect than is the case after the toaster has become thoroughly heated. A further object of the present invention is to produce a simple automatic compensator for the condition just described.

Figure 2:
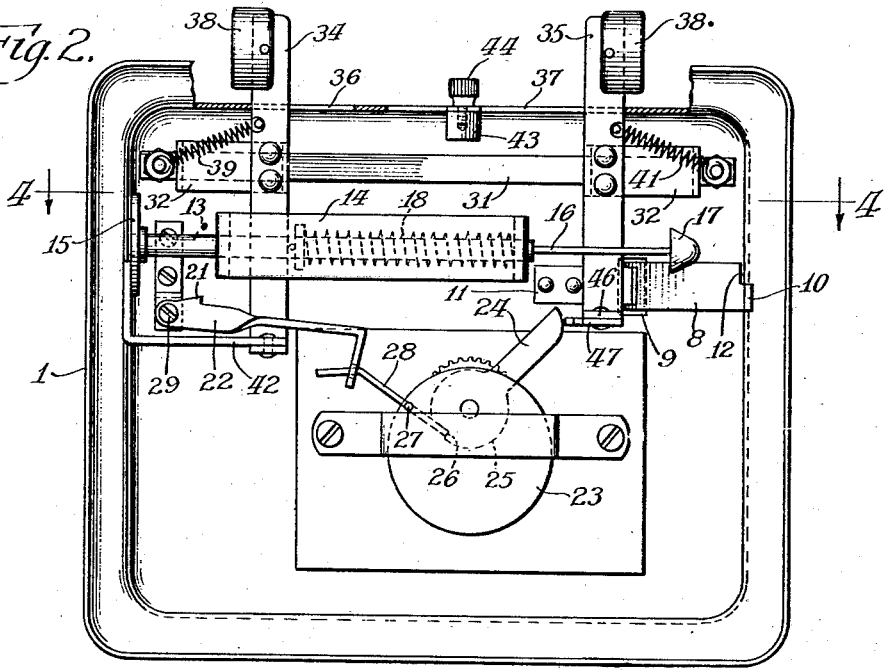

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a view of one of my improved toasters, partly in side elevation and partly in section, the holder being shown in full lines in the "open" position and in dotted lines in the "closed" position; Fig. 2 is a bottom plan view of the base of the toaster, a fragment of the front wall being broken away; Fig. 3 is a view similar to Fig. 2, showing the mechanism as it appears when the finger pieces have been pressed together to stress all of the springs, whereas in Fig. 2 the fingers are at the farthest limits from each other; Fig. 4 is a section on line 4—4 of Fig. 2; Fig. 5 is a section on line 5—5 of Fig. 4; and Fig. 6 is a perspective view of a fragment of the mechanism, illustrating the automatic compensating device.

Referring to the drawings, I represents the base and 2 the stationary superstructure or housing of a toaster of any usual or desired size or shape, the housing containing heating elements 3 of any suitable type. The greater portion of the top wall and one of the side walls are separate from the remainder of the casing and are joined together to form an L-shaped member 4 which serves both as a door and as a toast holder. The member 4 is hinged at the free edge of one of its wings or flanges to the top of the base, as indicated at 5, whereby the member 4 may either be swung outwardly as shown in full lines in Fig. 1, or upwardly and inwardly to close the open top and end of the casing. The holder may carry any suitable racks or supports 6 for receiving slices of bread or other material to be toasted.

Secured to the holder 4 is a bar 7 extending at right angles to the hinge axis of the holder. The end of the bar in the vicinity of the hinge axis projects beyond the holder and into the casing proper, being bent, as indicated at 8, into the arc of a circle whose center is at the hinge axis. This curved part or tail extends down into the interior of the hollow base through a hole 9 in the top wall of the latter. The extreme free end of the tail is bent laterally, as indicated at 10 and strikes against the under side of the top wall of the base when the holder is swung outwardly into its open position, thereby serving as a stop to limit such outward movement. A curved spring 11 may be fastened to the underside of the top wall of the base inwardly from the hole 9; the parts being so proportioned that when the holder is swung into its open position, the bent end or lug 10 on the tail piece rides upwardly along the spring 11 and is yieldingly held by the latter against the top wall of the base. As best shown in Figs. 2 and 3, the bent end or lug 10 is only half as wide as the tail proper so that a part of the tail terminates in a vertical edge 12.

In accordance with one feature of my invention, the toast holder may be swung outwardly by a suitable actuator which is not connected with the holder in any way, which actuator alternately engages itself with and releases itself from the vertical edge 12 at the lower end of the tail piece. In the arrangement shown, this actuator is a long bar 13 extending through the greater portion of the length of the base at right angles to the hinge axis of the toast holder and in about the horizontal plane of the lower end of the body of the tail piece when the latter is in its lowermost position, as shown in Fig. 4. This bar is mounted in a suitable stationary bracket 14 for reciprocatory lengthwise movements. On one end of this bar beyond the bracket 14 is a disk-like head 15 of considerable diameter. Projecting from the other end of the bar is a long resilient stem 16 which may be a piece of spring wire. On the free end of the part 16 is a head 17 which may be said to be conical, the stem and the head being coaxial and the stem being joined to the head at the base of the latter. Surrounding the bar 13, within the bracket, is a compression spring 18 engaging at one end with the bracket and at its other end with a collar 19 fixed to the bar. Normally, when the toaster is not in use, the bar stands in the position illustrated in Figs. 2 and 4, all parts thereof lying on one side and clear of the tail piece 8. Upon applying pressure to the disk-like head 15 to force the bar toward the right as viewed in Figs. 2 and 4, the conical head 17 rides under the tail piece 8 and is depressed somewhat by the latter, the bending of the stem 16 permitting this, until the head passes the plane of the vertical edge 12; whereupon the conical head springs up and catches behind the edge 12. Then, after conditions are such that the spring 18 may act to retract the rod 13, such retraction will take place and the conical head 17 will draw back the lower end of the tail piece 8 and cause the toast holder to swing out. After the toast holder has been moved so as to carry its center of gravity outwardly from its hinge axis, it will move on to its fully opened position through the action of gravity.

When the actuating rod 13 is shifted into interlocking relation with the tail on the toast holder, as shown in Fig. 3, a nose 21 on a suitable catch or dog 22 catches behind the disk 15, as shown in Fig. 2 and locks the actuator against retraction until the catch is tripped. The tripping of the catch is effected by a suitable timing device which, in the arrangement shown, is a suitable clockwork mechanism 23. There is nothing novel in the clockwork mechanism itself, and I have therefore not illustrated nor shall I describe it in detail. The important thing about the timing device is its lever 24 for winding the spring. This lever has an enlarged disk-like part 25 whose center is coincident with the pivotal axis of the lever. The part 25 has a peripheral notch 26. Pivoted between its ends to the casing of the clockwork, as indicated at 27, is an arm or rod 28, one end of which rides on the periphery of the part 25, where the other end passes loosely through a hole in the free end of the member 22 which is hinged to the base close to the nose 21, as indicated at 29.

Normally, in the idle positions of the parts, the nose on the catch device is out of the path of travel of the disk 15, as shown in Fig. 2, while one end of the rocker member 28 rests in the notch 26 in the periphery of the part 25. When the lever 24 of the timing device is operated to energize the timing device, by turning it in the counter-clockwise direction from the position illustrated in Fig. 2, the end of the rocker member that engages with the disk-like inner end of the lever rides out of the notch 26 and up on the unmutilated portion of the edge of the disk, causing the rocker member to turn and swinging the catch member 22 in a direction to engage the nose 21 thereof behind the disk 15, as shown in Fig. 3; assuming, of course, that the actuating rod 13 has previously been moved into the position indicated in Fig. 3. It will therefore be seen that if the actuator 13 is shifted to compress its spring and the lever of the timing device is immediately thereafter swung through a working stroke, the actuator 13 will be locked against retraction until the spring in the timing device has again become unwound and the adjacent end of the rocker member 28 permitted to drop again into the notch 26. It will be seen that during the time that the timing device is holding the catch in its locking position, there is very little load upon the same because the rocker member 28 simply rests against the edge of the disk 15 and therefore offers a very slight frictional resistance to the turning of this disk. The actual tripping of the catch might be said to involve no work because it results simply from the dropping of an end of the rocker member back into the notch in the periphery of the disk. It therefore follows that the spring that drives the actuator 13 through a backward or working stroke may be a very powerful one without in any way influencing the timing device; and, furthermore, that whereas the lever 24 of the timing device must of necessity move very slowly through its arc, the force of the spring on the actuator is released suddenly, so that the holder is thrown open with a quick or snap action.

The actuator for the toast holder and the level of the timing device may conveniently be operated by two finger pieces which normally are spread a considerable distance apart and may therefore be easily grasped between the thumb and another finger of the same hand and be squeezed toward each other. In the arrangement shown, there is a square bar 31 mounted in the top of the hollow base parallel with the actuating bar 13. Slidable on the bar 31 are two carriers 32, 32. Each carrier, as best shown in Fig. 6, comprises a metal plate or flat bar bent into the shape of a U, each arm of the U being provided with a square hole 33 in which the bar 31 is a sliding fit. To each of the carriers is fixed an operating bar, these being indicated at 34 and 35; these bars extending at right angles to the bar 31. The bars 34 and 35 project outwardly through slots 36 and 37, respectively, in the front wall of the base and have on their free ends little buttons or finger pieces 38, 38. Between the free ends of the bar 31 and each of the bars 34 and 35 is a tension spring, these being indicated at 39 and 41, respectively; the parts being so proportioned that normally the springs draw the bars 34 and 35 apart as far as permitted by the slots through which these bars pass, as shown in Fig. 2. When the finger pieces or buttons are pressed toward each other, the springs 39 and 41 are of course placed under tension, energy being stored up therein to permit the operating bars to be returned to their normal positions of rest when released. On the inner end of the operating bar 34 is an L-shaped piece or bracket 42 the short arm of which extends behind the disk 15 on the actuator. Consequently, when the operating bar 34 is moved toward the right, as viewed in Fig. 2, it carries the actuating member 13 with it. However, assuming that the actuating bar has been moved into interlocking relation with the tail piece on the toast holder and has been engaged with the latch or catch 22, the subsequent release of the operating bar 34 produces no further effect than to cause its return to its normal idle position which is that of Fig. 2.

The inner end of the operating bar 35 is provided with means to engage with the lever 24 of the timing device, without being positively connected thereto, however. Furthermore, arranged in and adjustable lengthwise of the slot 37, between the bar 35 and the bar 34, is a stop to limit the scope of movement of the bar 35 and, therefore, the angle through which the lever 24 of the timing device will be turned whenever the bar 35 is shifted as far as it will go, at any given time, from its idle position. This stop may conveniently comprise a nut 43 on the inner side of the front wall of the base, and a headed screw 44 located on the outside of this wall and extending through the slot 37 and into the nut. The screw has a knurled head, whereby it may easily be turned by the fingers of the user. On the outer side of the front wall of the base are suitable graduations and associated legends 45 to indicate the point at which the stops should be set for the kind of toast desired.

It takes somewhat longer to toast the first piece or batch, while the toaster is warming up, than it does after the toaster has become thoroughly warmed. I have therefore provided compensating means which, without shifting the adjustable stop for the bar 35, will produce a variation in the angle through which the lever 24 of the timing device is moved by this bar, according to the temperature condition of the toaster. In the arrangement shown, the inner end of the bar 35 is bent downwardly at right angles, as indicated at 46, as best shown in Fig. 6. Lying flat against the downward extension 46 is a plate 47 bent laterally at the top, as indicated at 48, to provide a flange overlying the body portion of the bar 35. This plate has therein a long vertical slot 49. Suitable rivets or headed pins 51, 51, passing through the slot 49 and into the part 46, hold the plate 47 loosely against the latter while permitting it to move freely up and down within the limits permitted by the pin and slot connection. Lying on top of the inner or rear end of the bar 35 is a thermo-responsive plate or strip 52, fixed at its forward end to the bar and having its rear, free end underlying the flange 48. Normally, when the toaster is cold, the element 52 lies flat on the bar 35, as shown in full lines in Fig. 5. As the parts of the toaster become heated, the element 52 begins to assume a bow shape and, since the forward end is held down upon the bar, the free rear end rises and, through its engagement with the flange 48, lifts the plate 47. The vertical edge of the plate 47 on the side toward the lever 24 of the timing device has a step formation. In the arrangement shown, there are three of these steps, 53, 54 and 55, produced by gradually widening the plate from the top to the bottom. When the toaster is cold and the plate 47 is in its lowermost position, the step 55 engages with the lever 24 when the bar 35 is pressed toward the left, as viewed in Figs. 2 and 3, there being little or no lost motion before the bar 35 begins to actuate the lever 24. When the temperature has increased sufficiently to raise the plate 47 through the distance of one step, the step 54 is brought into play upon the setting of the mechanism through the finger pieces together. It is now necessary for the bar 35 to travel a distance equal to the height of one of the steps, farther than it did before, in order to make contact with the timing device lever. Therefore, the spring in the timing device will not be wound quite as much by the time that the stop 43, 44 arrests the movement of the bar 35, as was the case in the first setting, and therefore, the toast holder actuator will be tripped sooner. When the toaster becomes fully heated, the plate 47 is lifted to its extreme upper position and the lower step 53 thereon serves to make the contact with the lever 24. The effective part of the movement of the operating bar 35 is thus still further reduced and the time that elapses after the setting of the timing device and the tripping of the actuator for the toast holder is shortened still further.

It is believed that the operation has been described in connection with the structural features. However, it may be said that normally the toaster and the control mechanism are as indicated in Figs. 1 and 2; there being no connection between the actuator for the toast holder and the tail piece 8 on the latter. Therefore, the toast holder may be swung at will to either its open or closed position. When the toaster is to be put in use and the current has been turned on, the holder is filled with the piece or pieces to be toasted and is then swung into the dotted line position in Fig. 1 to bring its contents within the confines of the casing or housing. The stop 43, 44 having been set at the desired point along the slot 37, the user, with the fingers of one hand, spans the finger pieces 38, 38, and presses them together. Because the angular movement of the actuating lever 24 of the timing device is small, the operating bar 35 therefore must travel slowly. However, the movement of the operating bar 34 effects a direct compression of the spring 18. Therefore, the bar 34 moves quickly throughout the length of its slot 36. Thus, the disk-like head 15 on the actuating bar is quickly carried beyond the nose 21 on the catch device 22 so that when the catch device is swung up, as heretofore explained, the head 15 is in position ready for locking. When the two finger pieces have travelled as far as they will go, as shown in Fig. 3, they are released and are returned with their bars 34 and 35 to the positions illustrated in Fig. 2. However, the actuator for the toast holder remains in the position illustrated in Fig. 3, interlocked with the tail piece 8, and the lever 24 of the timing device begins slowly to travel back to the starting point which it reaches only after a predetermined time period has elapsed. At the end of such time period, the catch is tripped, and the actuator, being suddenly released, flies back into the position illustrated in Fig. 2, throwing the toast holder outwardly and, in the process of doing so, freeing itself from the toast holder so that the latter may be moved by hand without affecting or being affected by the automatic controlling mechanism.

It will thus be seen that I have produced an extremely simple, rugged and efficient mechanism whereby bread or the like may be toasted for any accurately measured period of time within the range for which a toaster may be designed; which makes adjustment of the timing simple and easy; and in which the toast holder is entirely freed from all operating mechanism except during a toasting period, whereby the holder may be swung back and forth freely. Of course, the toaster may be employed as a non-automatic device by simply failing to set the timing mechanism, in which case the holder remains disconnected from the automatic mechanism not only while the toaster is idle but while the latter is in use.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, a heating element, a toast holder, means supporting said holder for rocking movements between a toasting position beside the heating element and an idle position, a tail on said holder, an actuator separate from and lying on one side of the said tail, said actuator being movable from and toward said tail, a shoulder on the actuator adapted to snap behind the tail when the actuator is moved forward and to draw the tail backward when the actuator makes a return stroke, a spring associated with the actuator and adapted to be compressed when the actuator is moved forward, a catch to lock the actuator in its forward position, a timing device, means operated by said timing device to trip said catch, and means including manually-operated finger pieces to energize the timing device and move said actuator forward.

2. In combination, a heating element, a toast holder, means supporting said holder for rocking movements between a toasting position beside the heating element and an idle position, a depending tail on said holder, an actuator separate from the tail and having a shoulder adapted to snap into engagement with the tail when the actuator is moved in one direction and then to pull on the tail and rock the holder when the actuator makes a return stroke, a spring associated with the actuator and adapted to be stressed when the actuator is moved into engagement with the said tail, a catch to lock the actuator against return movements after it has become engaged with the tail, a timing device, means operated by said timing device to trip said catch, and means including manually-operable finger pieces to energize the timing device and move said actuator in the direction to stress the spring.

3. In combination, a heating element, a toast holder, means supporting said holder for rocking movements between a toasting position beside the heating element and an idle position, a depending tail on said holder, an actuator separate from the tail and having a shoulder adapted to snap into engagement with the tail when the actuator is moved in one direction and then to pull on the tail and rock the holder when the actuator makes a return stroke, a spring associated with the actuator and adapted to be stressed when the actuator is moved into engagement with the said tail, a catch to lock the actuator against return movement after it has become engaged with the tail, a timing device, means operated by said timing device to trip said catch; and means separated from but movable into and out of engagement with the actuator and the timing device, and including manually-operable finger pieces and springs to return said finger pieces to their starting points after operation thereof, to energize the timing device and move the actuator into engagement with the tail on the toast holder.

4. In a toaster, a hollow base, toasting means including a movable toast holder mounted on said base, actuating mechanism including a spring for the holder within the base, a timing mechanism including a spring, a pair of operating and controlling bars for said mechanisms projecting outwardly through a wall of said base and movable bodily toward each other to store up energy in the aforesaid springs, said bars being separate from said mechanisms and being movable into and out of engagement with the latter, and springs acting on said bars to retract them when the bars are released after having been shifted toward each other.

5. In a toaster, a hollow base, toasting means including a movable toast holder mounted on said base, time-controlled actuating mechanism for the holder within the base, a pair of operating and controlling bars for said mechanism projecting outwardly through a wall of said base, said bars being separate from said mechanism but movable into and out of engagement with portions of the latter and being movable bodily from and toward each other to store up energy in said mechanism, an adjustable stop in the path of movement of one of said bars to limit the distance through which that bar may be moved, and springs acting on said bars to retract them when the bars are released after having been shifted toward each other.

6. In a toaster, a timing device having an element that must be moved to store up energy in the device, an operating member normally spaced apart from said element and adapted to be shifted into engagement with the latter and then cause it to be moved in the direction to store up energy, a stop device on said member adjustable to vary the normal spacing between said member and said element, and a thermostatic device adapted to move said stop device with changes in the temperature.

7. In a toaster, a timer having an element movable in a horizontal plane to store up energy in the timer when the toaster is supported in a predetermined position, an operating device normally spaced apart from said element and adapted to be shifted into engagement with the latter and then cause it to be moved in the direction to store up energy, said operating device including a bar and a vertical plate loosely mounted on the bar for limited vertical movements with respect thereto and having an edge facing said element, said edge being in step formation whereby the horizontal distance between the same and the said element varies with the vertical position of the plate on the bar, and a thermo-responsive part for raising said plate as the toaster becomes heated.

AUGUST C. PURPURA.